US012603461B2

(12) United States Patent
Xu et al.

(10) Patent No.: US 12,603,461 B2
(45) Date of Patent: Apr. 14, 2026

(54) COMMUNICATION INTERFACE

(71) Applicant: Tianjin Laird Technologies Limited, Tianjin (CN)

(72) Inventors: Yifan Xu, Tianjin (CN); Shaomei Shi, Tianjin (CN); Jingqi Zhao, Tianjin (CN)

(73) Assignee: Tianjin Laird Technologies Limited, Tianjin (CN)

( * ) Notice: Subject to any disclaimer, the term of this patent is extended or adjusted under 35 U.S.C. 154(b) by 358 days.

(21) Appl. No.: 18/234,744

(22) Filed: Aug. 16, 2023

(65) Prior Publication Data

US 2024/0063576 A1 Feb. 22, 2024

(30) Foreign Application Priority Data

Aug. 17, 2022 (CN) ......................... 202222162235.3

(51) Int. Cl.
*H01R 13/631* (2006.01)
*H01R 31/06* (2006.01)

(52) U.S. Cl.
CPC ........... *H01R 13/631* (2013.01); *H01R 31/06* (2013.01)

(58) Field of Classification Search
CPC ................ G02B 6/4277; H01R 13/631; H01R 13/6598; H01R 31/06
See application file for complete search history.

(56) References Cited

U.S. PATENT DOCUMENTS

| | | | | |
|---|---|---|---|---|
| 8,974,126 | B2 * | 3/2015 | Sloey | G02B 6/4204 385/93 |
| 9,178,308 | B1 * | 11/2015 | Kim | H01R 24/66 |
| 11,515,661 | B2 * | 11/2022 | Zechmann | H01R 24/64 |
| 2003/0236031 | A1 * | 12/2003 | Perugini | H01R 12/716 439/607.05 |
| 2008/0280470 | A1 * | 11/2008 | Byrne | H01R 25/00 439/215 |
| 2018/0316131 | A1 * | 11/2018 | Holub | H01R 43/26 |
| 2021/0119376 | A1 * | 4/2021 | Nakano | H01R 13/5202 |
| 2022/0094114 | A1 * | 3/2022 | Ohni | H01R 13/6585 |
| 2022/0360016 | A1 * | 11/2022 | Lu | H01R 13/516 |

* cited by examiner

*Primary Examiner* — Abdullah A Riyami
*Assistant Examiner* — Thang H Nguyen
(74) *Attorney, Agent, or Firm* — Harness, Dickey & Pierce, P.L.C.; Anthony G. Fussner

(57) ABSTRACT

A communication interface comprises a male connector interface and a female connector interface. The male connector interface includes at least one male connector. The female connector interface includes at least one female connector pluggable into the male connector of the male connector interface. An open channel and/or a gap for signal transmission is in the male connector interface and/or the female connector interface. Each of the male connector and the female connector includes a communication line structure, a guiding structure, a support structure, and a protection structure, at least one of which includes a wave absorbing portion configured to absorb an electromagnetic leakage from the male connector interface and/or the female connector interface via the open channel and/or the gap. The communication interface can effectively solve the problem of the leakage of electromagnetic energy inside the communication interface.

14 Claims, 3 Drawing Sheets

COMMUNICATION INTERFACE

CROSS REFERENCE TO RELATED APPLICATION

This application claims priority to and the benefit of Chinese Utility Model Application No. 202222162235.3 filed Aug. 17, 2022 (granted on Dec. 6, 2022 as Chinese Utility Model ZL202222162235.3). The disclosure of this application is incorporated herein by reference in its entirety.

TECHNICAL FIELD

The present application relates to the field of communication technologies, and particularly, to a communication interface.

BACKGROUND

This section provides background information which is not necessarily prior art.

SUMMARY

Exemplary embodiments provide a communication interface to solve the problem of the leakage of electromagnetic energy inside the interface.

A communication interface comprises a male connector interface and a female connector interface pluggable into each other, the male connector interface being provided with at least one male connector, and the female connector interface being provided with at least one female connector connectable to the male connector by plugging; and an open channel and/or a gap formed in the male connector interface and/or the female connector interface for signal transmission, wherein each of the male connector and the female connector is provided with a communication line structure, a guiding structure, a support structure and a protection structure, at least one of which is provided with a wave absorbing portion configured to absorb an electromagnetic leakage from the male connector interface and/or the female connector interface via the open channel and/or the gap.

In an embodiment, the support structure of the female connector comprises a female receiving channel, and the support structure of the male connector comprises a male contacting end face and a male insertion block insertable into the female receiving channel, the male contacting end face encloses a periphery of the female receiving channel, and the wave absorbing portion is formed on at least one of the female receiving channel, the male insertion block and the male contacting end face.

In an embodiment, the support structure of the female connector is provided with a guiding structure, the male insertion block of the male connector is provided with a guiding structure fitted with the guiding structure of the female receiving channel, and the wave absorbing portion is further formed on the guiding structure of the male insertion block and/or the guiding structure of the female receiving channel.

In an embodiment, the communication line structure of the female connector penetrates into the female receiving channel, the communication line structure of the male insertion block penetrates into the guiding structure of the male insertion block, and the wave absorbing portion is further formed on the communication line structure of the female connector and/or the communication line structure of the male insertion block.

In an embodiment, the wave absorbing portion is a structural layer formed on the communication line structure, the guiding structure, the support structure and the protection structure.

In an embodiment, the male connector interface and/or the female connector interface comprises a shielding shell which covers the male connector and/or the female connector, and the male connector and/or the female connector comprises a protective cover disposed outside the male connector and/or the female connector.

In an embodiment, the male connector interface and the female connector interface are connected to each other by threaded connection or snapping.

In an embodiment, the wave absorbing portion is made of a ferrite material, a ferrosilicon aluminum material, a carbonyl iron powder material, a silicon carbide material, a carbon nanotube, graphene or carbon powder.

Exemplary embodiments may have the following characteristics and advantages: in the communication interface, at least one of the communication line structure, the guiding structure, the support structure and the protection structure on each of the male connector and the female connector is provided with a wave absorbing portion, which can effectively solve the problem of the leakage of electromagnetic energy inside the interface, particularly high frequency electromagnetic energy leaked from the open channel or the gap inside the interface.

BRIEF DESCRIPTION OF THE DRAWINGS

In order to more clearly illustrate the technical solutions in the embodiments, the drawings to be used in the description of the embodiments will be briefly introduced below. It is apparent that the drawings involved in the following description merely illustrate some embodiments, and those skilled in the art can obtain other drawings therefrom without paying creative labor.

REFERENCE NUMERALS

10: male connector interface; 1: male connector; 11: support structure; 111: male contacting end face; 112: male insertion block; 12: guiding structure; 13: communication line structure; 14: protective cover; 20:

female connector interface; 2: female connector; 21: support structure; 211: female receiving channel; 22: guiding structure; 23: communication line structure; 24: shielding shell; 3: open channel; 4: gap.

DETAILED DESCRIPTION OF THE PREFERRED EMBODIMENTS

The technical solutions of the embodiments will be described clearly and completely below with reference to the drawings for the embodiments. Obviously, those described are only a part, rather than all, of the embodiments. Based on the embodiments, any other embodiment obtained by those of ordinary skill in the art without paying creative labor should fall within the protection scope.

It should be noted that when an element is referred to as being ‘disposed on’ another element, it may be directly on another element or there may also be an intervening element. When an element is considered as being ‘connected to’ another element, it may be directly connected to another element or there may also be an intervening element. The terms ‘vertical’, ‘horizontal’, ‘left’, ‘right’, and similar expressions used herein are for illustrative purposes only and are not intended to indicate any exclusive embodiment.

Unless otherwise defined, all technical and scientific terms used herein have the same meanings as those commonly understood by persons of ordinary skill in the art. The terms used in the description are only for the purpose of describing the particular embodiments and are not intended to limit the scope of this patent application. As used herein, the term ‘and/or’ includes any and all combinations of one or more of the associated listed items.

Figure 1:
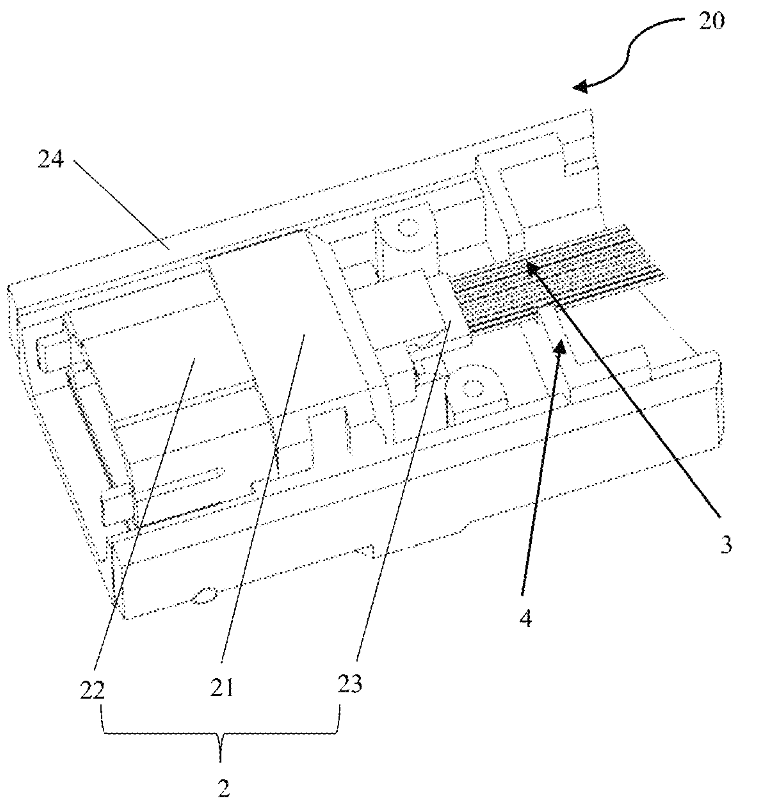
FIG. 1 is a schematic diagram of an internal structure of a female connector interface of a communication interface according to an exemplary embodiment.
Figure 2:
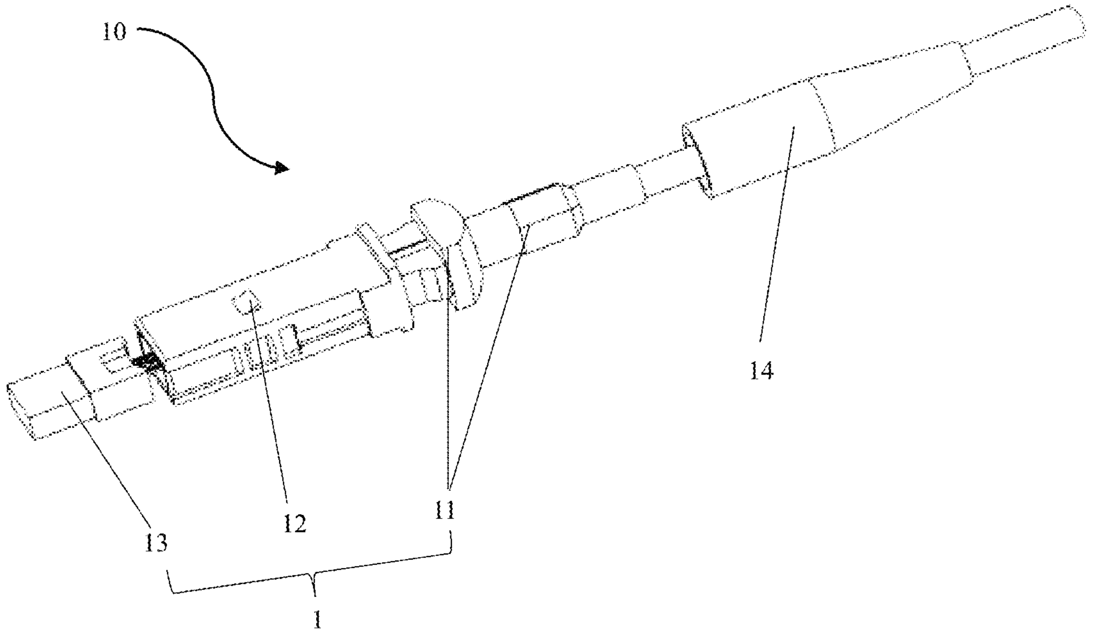
FIG. 2 is a schematic diagram of an exploded structure of a male connector interface of a communication interface according to an exemplary embodiment.

As illustrated in FIGS. 1 and 2, an exemplary embodiment provides a communication interface, comprising a male connector interface 10 and a female connector interface 20 pluggable into each other, the male connector interface 10 being provided with at least one male connector 1, and the female connector interface 20 being provided with at least one female connector 2 connectable to the male connector 1 by plugging; and an open channel 3 and/or a gap 4 formed in the male connector interface 10 and/or the female connector interface 20 for signal transmission, wherein each of the male connector 1 and the female connector 2 is provided with a communication line structure, a guiding structure, a support structure and a protection structure, at least one of which is provided with a wave absorbing portion configured to absorb an electromagnetic leakage from the male connector interface 10 and/or the female connector interface 20 via the open channel 3 and/or the gap 4.

In the communication interface, at least one of the communication line structure, the guiding structure, the support structure and the protection structure on each of the male connector interface 10 and the female connector interface 20 is provided with a wave absorbing portion, which can effectively solve the problem of the leakage of electromagnetic energy inside the interface, particularly high frequency electromagnetic energy leaked from the open channel 3 or the gap 4 inside the interface.

The communication interface may be an optical communication interface, such as an optical fiber interface or a high-speed interface applied to a data center switch, which for example may be a QSFP28 optical module, a QSFP-DD optical module, an OSFP optical module, an MPO 16/32 core optical fiber connector, an LC ordinary dual-core connector, an SC dual-core optical fiber connector, an ST optical fiber connector, an FC optical fiber connector, and an MDC optical fiber connector. These optical fiber interfaces usually include an optical interface male connector and an optical interface female connector pluggable into each other, wherein the optical interface male connector may be a connector end connected with an optical fiber cable, and the optical interface female connector may be an optical module provided with an electrical connector and a PCB. Of course, the communication interface may also be an electromagnetic interface, a circuit interface or the like, which is not limited here.

The inventor has found that in order to solve the problem of Electro Magnetic Compatibility (EMC), an electronic product or an electronic device is generally provided with a shielding shell or a shielding cover, which is generally made of metal or other conductive material, such as conductive films or conductive plastic. However, according to functional or structural requirements, the electronic product or the electronic device is generally provided therein with the open channel 3 for the signal transmission line to pass through and the gap 4 generated after the shell or the shielding cover is mounted. With the emergence and application of a high fundamental frequency connectors, the open channel 3 or the gap 4 become a channel for electromagnetic radiation.

By disposing a wave absorbing portion made of a wave absorbing material on the male connector interface 10 and/or the female connector interface 20 of the communication interface, where the wave absorbing portion for example may be disposed on at least one of the communication line structure, the guiding structure, the support structure and the protection structure on the male connector interface 10 or the female connector interface 20, high fundamental frequency electromagnetic radiation can be effectively prevented. Alternatively, in another embodiment, the gap 4 of the communication interface may be filled with a wave absorbing material layer, which can also effectively prevent high fundamental frequency electromagnetic radiation. In this embodiment, the wave absorbing material may be a ferrite material, a ferrosilicon aluminum material, a carbonyl iron powder material, a silicon carbide material, a carbon nanotube, graphene or carbon powder.

Figure 3:
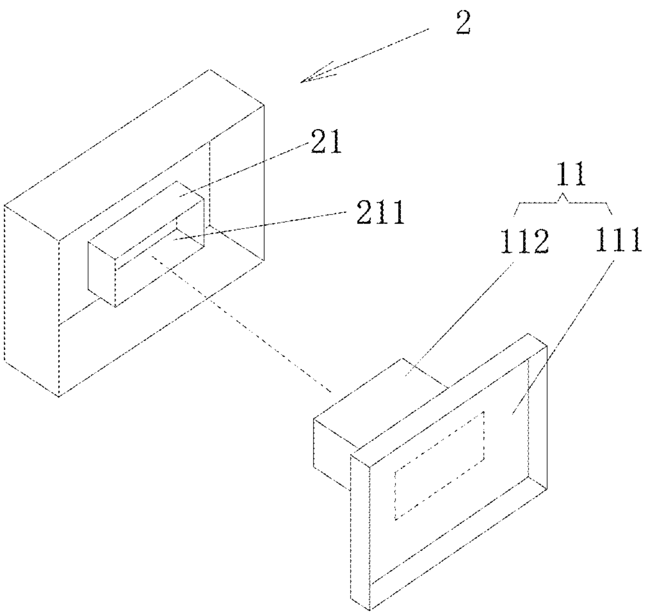
FIG. 3 is a schematic diagram of an exploded structure in which a male connector of a male connector interface is fitted with a female connector of a female connector interface according to an exemplary embodiment.
Figure 5:
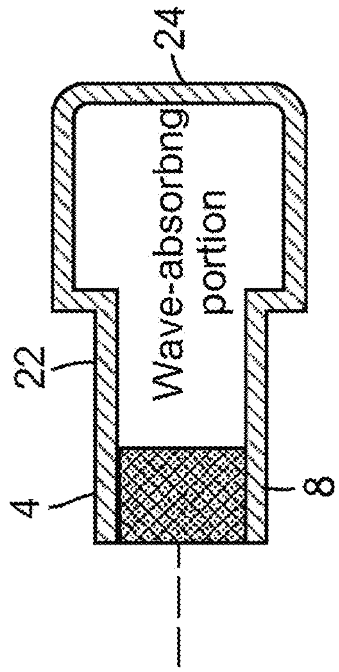
FIG. 5 is a sectional view of a female connector interface illustrating the shielding shell (24), the guiding structure (22), and the wave-absorbing portion (hatched) disposed on internal structures adjacent to the open channel and gap.
Figure 4:
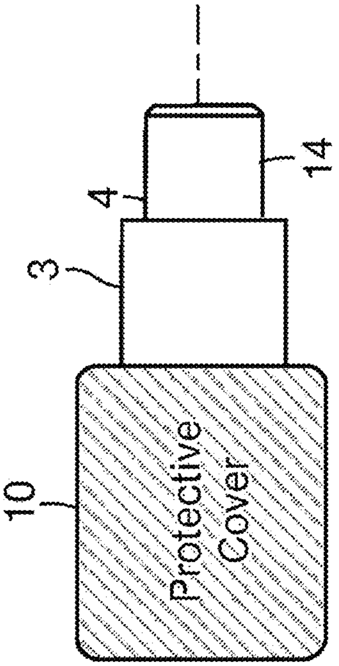
FIG. 4 is a schematic view of a male connector interface showing the protective cover (10), the open channel (3), and the gap (4), with hatching applied to indicate the wave-absorbing material integrated into the protective cover.
Figure 6:
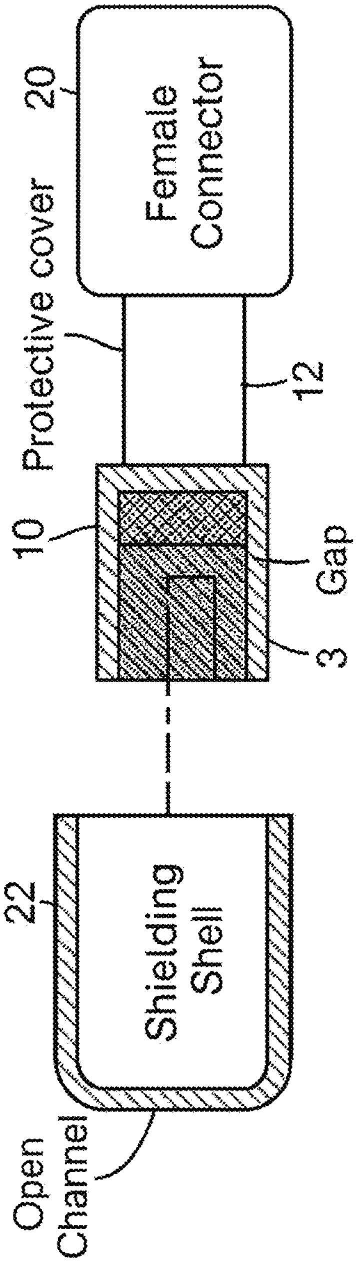
FIG. 6 is an exploded view of the male and female connector interfaces, depicting the open channel, gap, protective cover, and shielding shell, with hatching applied to the guiding and support structures to indicate the presence of wave-absorbing material.

According to an embodiment, as illustrated in FIG. 3, the support structure 21 of the female connector 2 includes a female receiving channel 211, and the support structure 11 of the male connector 1 includes a male contacting end face 111 and a male insertion block 112 insertable into the female receiving channel 211, the male contacting end face 111 encloses a periphery of the female receiving channel 211, and the wave absorbing portion is formed on at least one of the female receiving channel 211, the male insertion block 112 and the male contacting end face 111.

Specifically, the wave absorbing portion is formed on the female receiving channel 211, the male insertion block 112 or the male contacting end face 111; alternatively, the wave absorbing portion is formed on both of the female receiving channel 211 and the male insertion block 112; alternatively, the wave absorbing portion is formed on both of the female receiving channel 211 and the male contacting end face 111; alternatively, the wave absorbing portion is formed on both of the male insertion block 112 and the male contacting end face 111; alternatively, the wave absorbing portion is formed on each of the female receiving channel 211, the male insertion block 112 and the male contacting end face 111.

With reference to FIGS. 1 and 2, the support structure 21 of the female connector 2 is provided with a guiding structure 22 which is located in the female receiving channel 211; the male insertion block 112 of the male connector 1 is provided with a guiding structure 12, which can be fitted with the guiding structure 22 in the female receiving channel 211, and a wave absorbing portion may also be formed on the guiding structure 12 of the male insertion block 112 and/or the guiding structure 22 of the female receiving channel 211.

Specifically, the wave absorbing portion is formed on the guiding structure 12 of the male insertion block 112 or the guiding structure 22 of the female receiving channel 211; alternatively, the wave absorbing portion is formed on both of the guiding structure 12 of the male insertion block 112 and the guiding structure 22 of the female receiving channel 211. In the process of inserting the male insertion block 112 into the female receiving channel 211, the guiding structure 22 and the guiding structure 12 cooperate with each other, so that the insertion or withdrawal therebetween is smoother and faster.

According to an embodiment as illustrated in FIGS. 1 and 2, the communication line structure 23 of the female connector 2 penetrates into the female receiving channel 211, the communication line structure 13 of the male insertion block 112 penetrates into the male insertion block 112, and the wave absorbing portion is further formed on the communication line structure 23 of the female connector 2 and/or the communication line structure 13 of the male connector 1.

Specifically, the wave absorbing portion is formed on the communication line structure 23 of the female connector 2 or the communication line structure 13 of the male connector 1; alternatively, the wave absorbing portion is formed on both of the communication line structure 23 of the female connector 2 and the communication line structure 13 of the male connector 1.

Further, the wave absorbing portion may be formed on the protection structure of the male connector 1 or the protection structure of the female connector 2; alternatively, the wave absorbing portion may be formed on both of the protection structure of the male connector 1 and the protection structure of the female connector 2.

In the prior art, the support structure 21 and the guiding structure 22 of the female connector 2 are generally made of a liquid crystal polymer (LCP) material, which plays the roles of guiding and supporting to align and interconnect optical fibers. In this embodiment, the support structure 21 and the guiding structure 22 of the female connector 2 are made of a wave absorbing material filled with carbonyl iron powder as an LCP substrate, and the electromagnetic radiation leaked from the channel is significantly reduced by 27.83 dB compared with the prior art, thus effectively suppressing the electromagnetic radiation (EMI) of the electronic device.

In the prior art, the guiding structure 12 of the male connector 1 is generally made of a liquid crystal polymer (LCP) material, which plays the role of guiding to align and interconnect optical fibers. In this embodiment, the guiding structure 12 of the male connector 1 is made of a wave absorbing material filled with carbonyl iron powder as an LCP substrate, and the electromagnetic radiation leaked from the channel is significantly reduced by 14.27 dB compared with the prior art, thus also effectively suppressing the electromagnetic radiation (EMI) of the electronic device.

In this embodiment, the support structure 21 and the guiding structure 22 of the female connector 2 and the guiding structure 12 of the male connector 1 are made of a wave absorbing material filled with carbonyl iron powder as an LCP substrate, and the electromagnetic radiation leaked from the channel is significantly reduced by 30 dB or more compared with the prior art, thus largely suppressing the electromagnetic radiation (EMI) of the electronic device.

According to an embodiment, the female receiving channel 211 is a rectangular channel, and the wave absorbing portion is formed on at least one side wall of the female receiving channel 211. That is, the wave absorbing portion is formed on one side wall or two opposite side walls of the female receiving channel 211; alternatively, the wave absorbing portion is formed on three side walls of the female receiving channel 211; alternatively, the female receiving channel 211 is wholly constituted by the wave absorbing portion in order to facilitate the manufacturing and reduce the manufacturing cost.

In this embodiment, supposing a length of a long side of an opening of the rectangular channel is a, the cutoff wavelength is:

$$\lambda_c=2a\sqrt{\mu_u\vartheta_r}$$

where $\lambda_c$ represents a cutoff wavelength of the channel, c represents a velocity of light, $\mu_r$ represents a relative permeability of a medium in the channel, and Er represents a relative dielectric constant of the medium in the channel.

According to communication requirements, the length of the long side of the opening of the channel is $$a > \frac{\lambda_c}{2\sqrt{\mu_r\varepsilon_r}},$$

and a wavelength of a radiated electromagnetic wave is less than a cut-off wavelength at the opening of the channel, so there is serious leakage of electromagnetic radiation at the channel. Even if there is an open channel 3 in the electronic device structure, with the length of the long side of the opening being $$a < \frac{\lambda_c}{2\sqrt{\mu_r\varepsilon_r}}$$

to limit the leakage of electromagnetic radiation, the leakage of electromagnetic radiation will still be caused due to the existence of the gap 4 at the open channel 3.

Of course, in other embodiments, a cross-sectional shape of the female receiving channel 211 may also be circular, elliptical, or irregular, which is not limited here. In summary, regardless of the cross-sectional shape of the female receiving channel 211, the cutoff wavelength of the channel is proportional to a maximum width of the opening of the female receiving channel 211.

According to an embodiment, the wave absorbing portion may also be a structural layer formed on the communication line structure, the guiding structure, the support structure and the protection structure. That is, the wave absorbing layer is attached to the communication line structure, the guiding structure, the support structure and the protection structure on each of the male connector 1 and the female connector 2, so as to reduce the processing cost.

According to an embodiment, the female connector interface 20 includes a shielding shell 24 which covers the female connector 2; and/or, the male connector interface 10 includes a protective cover 14. The protective cover 14 covers the male connector 1 and may be made of plastic or rubber.

Further, the male connector interface 10 and the female connector interface 20 are connected to each other by threaded connection or snapping.

Any numerical value recited herein includes all of lower and upper values increased by one unit from a lower limit value to an upper limit value, as long as there is an interval of at least two units between any lower value and any higher value. For example, if it is stated that the number of a component or the value of a process variable (e.g., temperature, pressure, time, etc.) is from 1 to 90, preferably from 20 to 80, and more preferably from 30 to 70, the purpose is to illustrate that the specification also explicitly lists such values as 15 to 85, 22 to 68, 43 to 51, 30 to 32. For values less than 1, it is appropriate to consider a unit as 0.0001, 0.001, 0.01 and 0.1. These are only examples that are intended to be clearly expressed, and it can be considered that all possible combinations of numerical values enumerated between the lowest value and the highest value are explicitly set forth in the specification in a similar manner.

Unless otherwise specified, any range include endpoints and all numerals therebetween. 'About' or 'approximately' used together with a range is suitable for both endpoints of the range. Therefore, 'about 20 to 30' is intended to cover 'about 20 to about 30', including at least the indicated endpoints.

All articles and reference data disclosed, including patent applications and publications, are hereby incorporated by reference for all purposes. The term 'substantially composed of . . . ' used to describe a combination should include the identified elements, compositions, components or steps as well as other elements, compositions, components or steps that do not substantively affect the basic novel features of the combination. The use of the terms 'comprise' or 'include' to describe a combination of elements, compositions, components or steps herein also contemplates the embodiments substantially composed of these elements, compositions, components or steps. By using the term 'may' here, it is intended that any described attribute included in 'may' is optional.

A plurality of elements, compositions, components or steps can be provided by a single integrated element, composition, component or step. Alternatively, a single integrated element, composition, component or step may be divided into separate elements, compositions, components or steps. The disclosure 'a' or 'one' used to describe an element, composition, component or step is not intended to exclude other elements, compositions, components or steps.

It should be understood that the above description is for illustration and not for limitation. Many embodiments and applications other than the provided examples will be obvious to those skilled in the art by reading the above description. Therefore, the scope of the present teaching should be determined not with reference to the above description, but with reference to a full range of the appended claims and equivalents thereof. For comprehensive purposes, all articles and reference data, including disclosures of patent applications and announcements, are hereby incorporated by reference. Omitting any aspect of the subject matter disclosed here in the claims is not to give up the content of the subject matter, and it should not be deemed that the inventor has not considered the subject matter as a part of that of the disclosed patent application.

The invention claimed is:

1. A communication interface comprising:

a male connector interface including at least one male connector;

a female connector interface including at least one female connector configured such that the male connector of the male connector interface is pluggable into the female connector; and an open channel and/or a gap for signal transmission in the male connector interface and/or the female connector interface;

wherein the male connector and the female connector each includes a communication line structure, a guiding structure, a support structure, and a protective structure, at least one of which includes a wave absorbing portion configured to absorb an electromagnetic leakage from the male connector interface and/or the female connector interface via the open channel and/or the gap; and wherein the protective structure comprises a protective cover of the male connector and/or a shielding shell of the female connector.

2. The communication interface of claim 1, wherein:

the support structure of the female connector comprises a female receiving channel;

the support structure of the male connector comprises a male contact end face configured to enclose a periphery of the female receiving channel and a male insertion block insertable into the female receiving channel; and the wave absorbing portion is on at least one of the female receiving channel, the male insertion block, and the male contact end face.

3. The communication interface of claim 2, wherein:

the female receiving channel includes the guiding structure;

the male insertion block of the male connector includes the guiding structure fitted with the guiding structure of the female receiving channel; and the wave absorbing portion is on the guiding structure of the male insertion block and/or the guiding structure of the female receiving channel.

4. The communication interface of claim 3, wherein:

the communication line structure of the female connector penetrates into the female receiving channel;

the communication line structure of the male insertion block penetrates into the guiding structure of the male insertion block; and the wave absorbing portion is on the communication line structure of the female connector and/or the communication line structure of the male insertion block.

5. The communication interface of claim 1, wherein the wave absorbing portion comprises a structural layer on at least one of:

the communication line structure, the guiding structure, the support structure, and the protection structure of the male connector; or the communication line structure, the guiding structure, the support structure, and the protection structure of the female connector.

6. The communication interface of claim 1, wherein the support structure and the guiding structure of the female connector are made of a wave absorbing material comprising carbonyl iron powder filled in a liquid crystal polymer (LCP) substrate.

7. The communication interface of claim 1, wherein the guiding structure of the male connector is made of a wave absorbing material comprising carbonyl iron powder filled in a liquid crystal polymer (LCP) substrate.

8. The communication interface of claim 1, wherein:

the support structure and the guiding structure of the female connector are made of a wave absorbing material comprising carbonyl iron powder filled in a liquid crystal polymer (LCP) substrate; and the guiding structure of the male connector is made of a wave absorbing material comprising carbonyl iron powder filled in a liquid crystal polymer (LCP) substrate.

9. The communication interface of claim 1, wherein:

the male connector interface comprises the protective cover that covers the male connector; and the female connector interface comprises the shielding shell that covers the female connector.

10. The communication interface of claim 1, wherein the male connector interface and the female connector interface are configured to be connected to each other by a threaded connection or by snapping.

11. The communication interface of claim 1, wherein the wave absorbing portion comprises a ferrite material, a ferrosilicon aluminum material, a carbonyl iron powder material, a silicon carbide material, a carbon nanotube, graphene, and/or carbon powder.

12. The communication interface of claim 1, wherein:

the communication interface is an optical fiber interface;

the male connector interface comprises an optical interface male connector configured to be connected with an optical fiber cable; and the female connector interface comprises an optical interface female connector configured such that the optical interface male connector is pluggable into the optical interface female connector, the optical interface female connector comprising an optical module including an electrical connector and a printed circuit board.

13. The communication interface of claim 1, wherein:

the wave absorbing portion comprises a structural layer on the communication line structure, the guiding structure, the support structure, and the protection structure of the male connector; and the structural layer comprises a ferrite material, a ferrosilicon aluminum material, a carbonyl iron powder material, a silicon carbide material, a carbon nanotube, graphene, and/or carbon powder.

14. The communication interface of claim 1, wherein:

the wave absorbing portion comprises a structural layer on the communication line structure, the guiding structure, the support structure, and the protection structure of the female connector; and the structural layer comprises a ferrite material, a ferrosilicon aluminum material, a carbonyl iron powder material, a silicon carbide material, a carbon nanotube, graphene, and/or carbon powder.

* * * * *